US011642997B2

(12) United States Patent
Kondo

(10) Patent No.: US 11,642,997 B2
(45) Date of Patent: May 9, 2023

(54) CUP HOLDER

(71) Applicant: Nifco Inc., Yokosuka (JP)

(72) Inventor: Koji Kondo, Kanagawa (JP)

(73) Assignee: NIFCO INC., Kanagawa (JP)

( * ) Notice: Subject to any disclaimer, the term of this patent is extended or adjusted under 35 U.S.C. 154(b) by 0 days.

(21) Appl. No.: 17/765,627

(22) PCT Filed: Aug. 19, 2020

(86) PCT No.: PCT/JP2020/031218
§ 371 (c)(1),
(2) Date: Mar. 31, 2022

(87) PCT Pub. No.: WO2021/065233
PCT Pub. Date: Apr. 8, 2021

(65) Prior Publication Data
US 2022/0402418 A1    Dec. 22, 2022

(30) Foreign Application Priority Data

Oct. 4, 2019 (JP) .............................. JP2019-183862

(51) Int. Cl.
*A47K 1/08* (2006.01)
*B60N 3/10* (2006.01)

(52) U.S. Cl.
CPC ............. *B60N 3/106* (2013.01); *B60N 3/101* (2013.01)

(58) Field of Classification Search
CPC ........ B60N 3/106; B60N 3/101; B60N 3/108; B60N 3/10; B60R 7/04
See application file for complete search history.

(56) References Cited

U.S. PATENT DOCUMENTS

| | | | |
|---|---|---|---|
| 7,789,265 B2 * | 9/2010 | Kearney ................ | B60N 3/106 220/737 |
| 7,866,620 B2 * | 1/2011 | Kaemmer .............. | B60N 3/106 248/314 |
| 9,469,231 B2 * | 10/2016 | Kang ..................... | B60N 3/102 |
| 9,561,745 B2 * | 2/2017 | Sawada ................. | B60N 3/101 |
| 9,834,122 B2 * | 12/2017 | Vaupotic ............... | B60N 3/108 |
| 10,086,736 B1 * | 10/2018 | Jacobsen ............... | B60N 3/106 |

(Continued)

FOREIGN PATENT DOCUMENTS

| | | |
|---|---|---|
| JP | 2002029304 A | 1/2002 |
| JP | 2003341680 A | 12/2003 |

(Continued)

OTHER PUBLICATIONS

International Search Report for Patent Application PCT/JP2020/031218 dated Oct. 13, 2020; 4 pp.

*Primary Examiner* — Amy J. Sterling
(74) *Attorney, Agent, or Firm* — Armstrong Teasdale LLP

(57) ABSTRACT

A cup holder that can prevent malfunction and generation of abnormal noise due to adhesion of liquid or other foreign matter is provided. The cup holder (1) includes a holder main body (2) for accommodating a container therein, and arms (3) each including an upper arm piece (10), a lower arm piece (11), and a hinge joint (12) connecting a lower end of the upper arm piece (10) to an upper end of the lower arm piece (11). The arm is an integrally molded product made of a resin material, and the hinge joint (12) is a thin-walled hinge formed by a thin-walled portion thereof.

9 Claims, 9 Drawing Sheets

(56) References Cited

U.S. PATENT DOCUMENTS

| | | | |
|---|---|---|---|
| 10,293,733 B2 * | 5/2019 | Kong .................... | B60N 3/108 |
| 2013/0256351 A1 | 10/2013 | Kodama et al. | |
| 2017/0274808 A1 | 9/2017 | Krishnan | |

FOREIGN PATENT DOCUMENTS

| | | | |
|---|---|---|---|
| JP | 2013208961 A | 10/2013 | |
| JP | 2017100725 A | 6/2017 | |

* cited by examiner

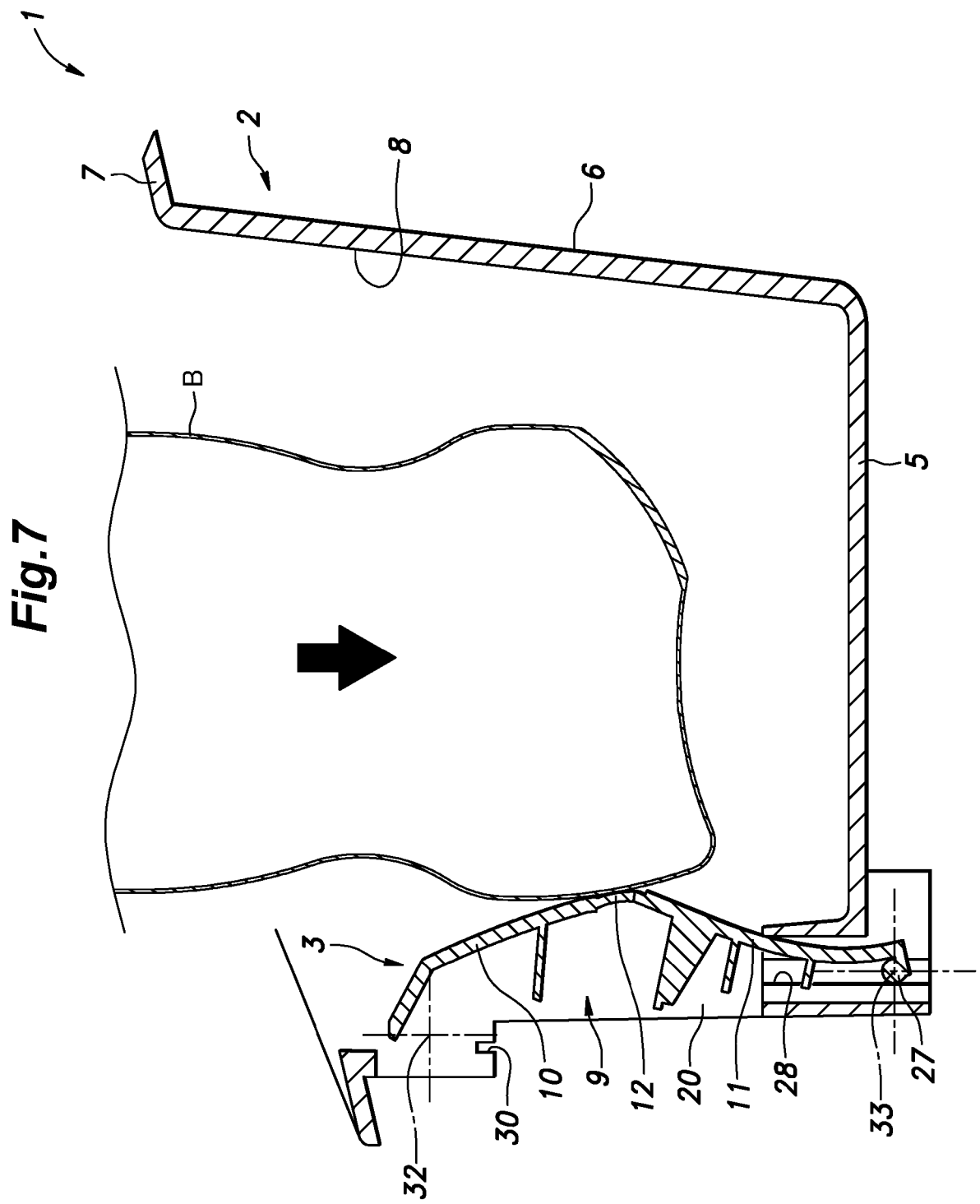

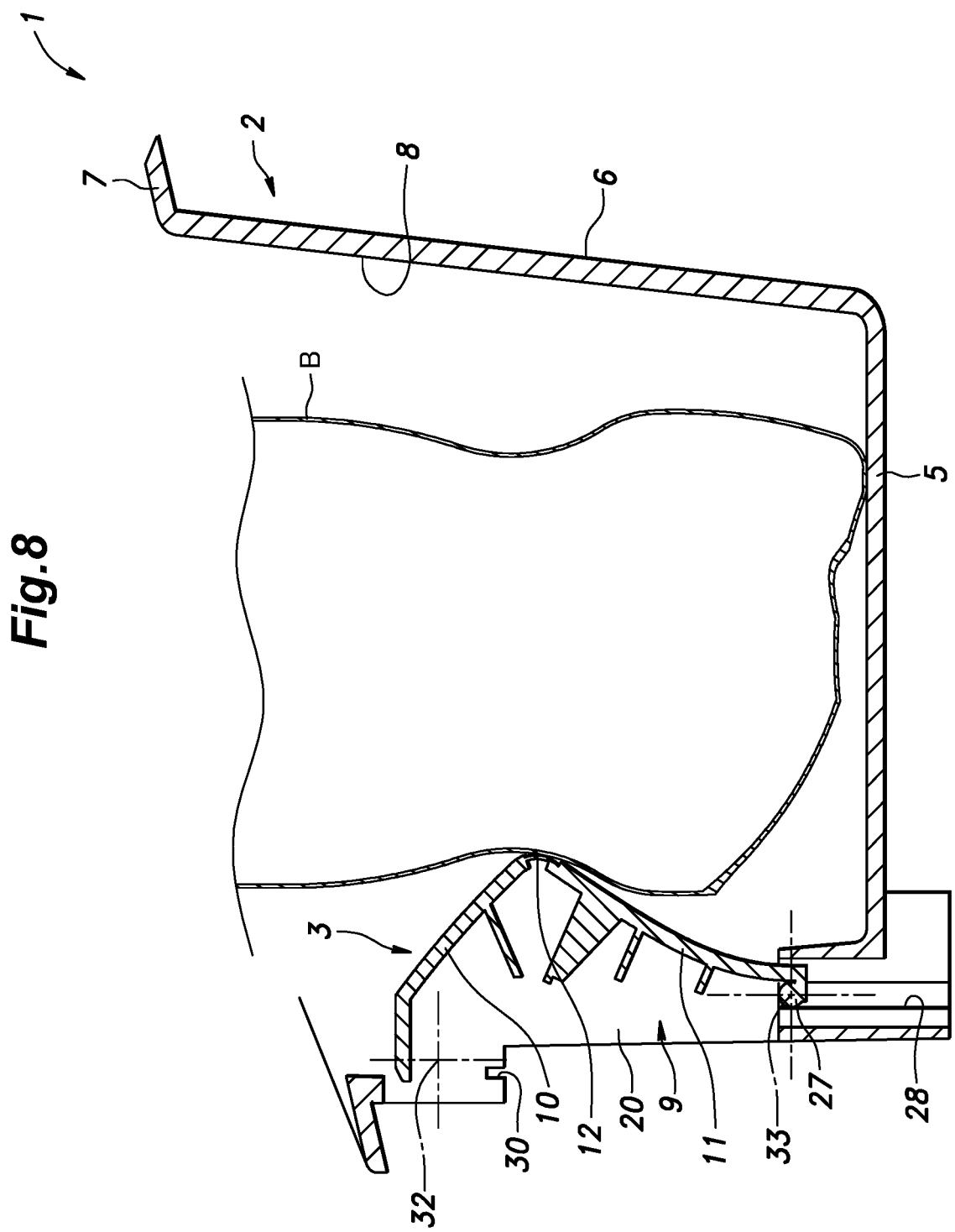

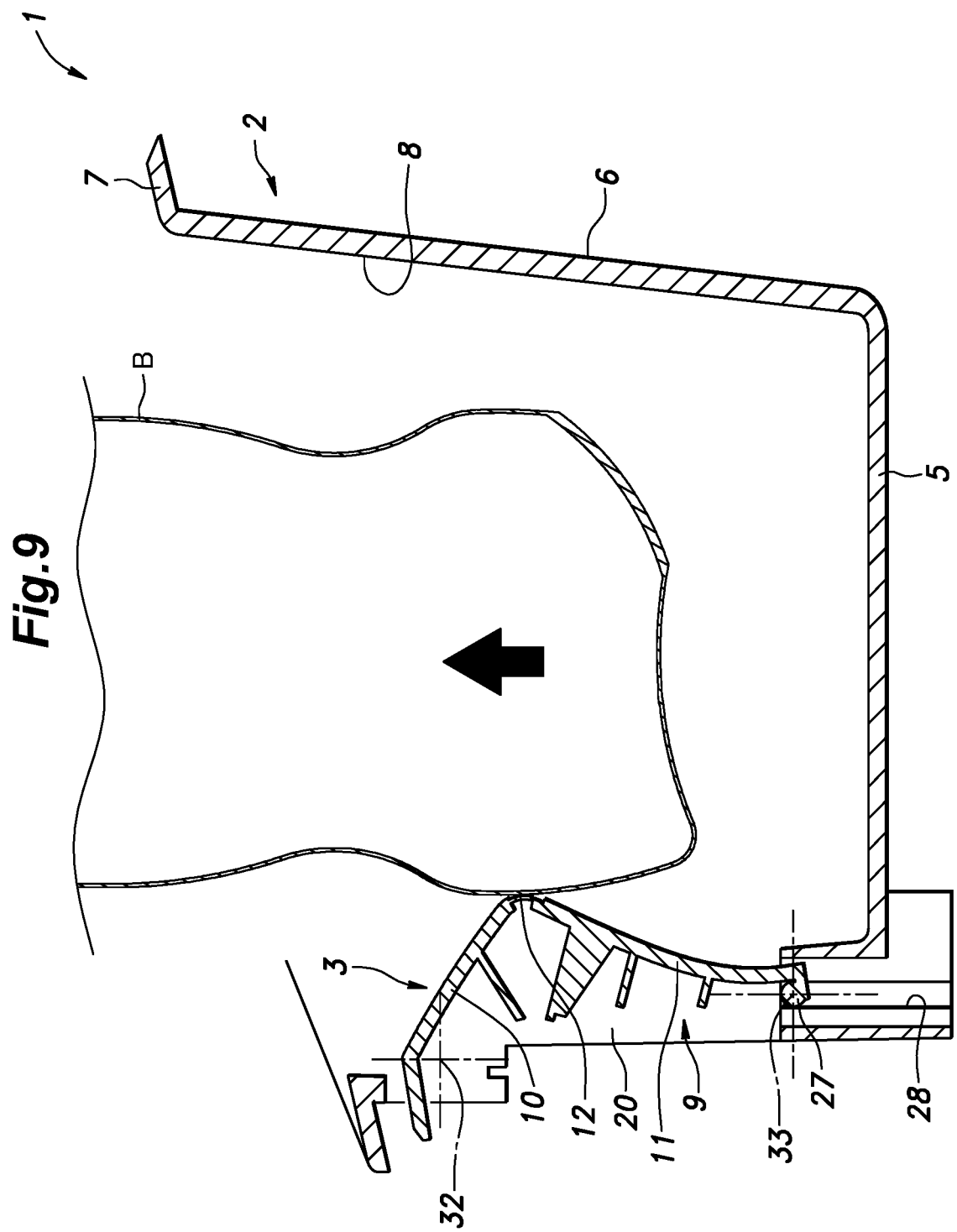

CUP HOLDER

CROSS-REFERENCE TO RELATED APPLICATIONS

This application is a U.S. National Phase Application of PCT/JP2020/031218 filed Aug. 19, 2020, which claims the benefit of Japanese Patent Application No. 2019-183862 filed Oct. 4, 2019. Each of these applications are hereby expressly incorporated by reference in their entirety.

TECHNICAL FIELD

The present disclosure relates to a cup holder configured to hold a container, and in particular to a cup holder that is installed in a vehicle such as a road vehicle to hold a beverage container.

BACKGROUND ART

Various cup holders to be installed in the passenger compartment of a vehicle are known. For example, the cup holder disclosed in Patent Document 1 includes a holder main body and a pair of arm-shaped support members that support a side surface of a container (cup). Each support member includes a first support piece and a second support piece that are hinged to each other to support the container at the hinge joint. The upper end of the first support piece positioned on the upper side is rotatably supported by the holder main body, and the lower end of the second support piece positioned on the lower side abuts against the inner surface of the holder main body in a rotatable and slidable manner. The hinge joint is formed by a shaft body provided at the upper end of the second support piece and a bearing provided at the lower end of the first support piece to retain the shaft body. When a container is put into the cup holder, the bottom edge of the container slides along the first support piece, and then the side surface of the container slides over the hinge joint. When the container is pulled out, the side surface of the container slides over the hinge joint.

PRIOR ART DOCUMENT(S)

Patent Document(s)

Patent Document 1: JP2013-208961A

Since the cup holder disclosed in Patent Document 1 is constructed such that the hinge joint supports the container, liquid or other foreign matter may adhere to the shaft body and the bearing, and this may be a cause of malfunction and abnormal noise. Further, when the container has a waist or a recessed part on the side, the hinge joint may catch the waist so that the container may not be removed in as smooth a manner as desired. Furthermore, the support member consists of so many component parts that the manufacturing cost tends to be high.

In view of such a problem of the prior art, a primary object of the present invention is to provide a cup holder that can prevent malfunction and generation of abnormal noise due to adhesion of liquid or other foreign matter. An object of a certain aspect of the present invention is to provide a cup holder that allows even a container having a recessed part on the side can be smoothly pulled out. An object of another aspect of the present invention is to provide a cup holder which can be manufactured at low cost.

Means to Accomplish the Task

According to an embodiment of the present invention, the cup holder (1) for holding a container, comprises: a holder main body (2) defining a recess (8) for accommodating a container therein and an arm receiving groove (9) extending vertically and communicating with the recess (8); at least one arm (3) including an upper arm piece (10) partly received in the arm receiving groove (9) and supported by the holder main body (2) at an upper end thereof, a lower arm piece (11) partly received in the arm receiving groove (9) and supported at a lower end thereof by the holder main body in a vertically movable manner, and a thin-walled portion that forms a hinge joint (12) between a lower end of the upper arm piece (10) and an upper end of the lower arm piece (11), in such a manner that the hinge joint allows the arm to be moveable between an initial position projecting into the recess and a most extended position located outward of the initial position; and a spring (4) that urges the arm (3) towards the initial position. Here, the outward and inward direction regarding the arm is defined such that the direction approaching the container to be retained is inward, and the direction moving away from the container is outward.

Since the hinge joint is formed by a thin-walled hinge, malfunction and abnormal noise can be avoided even if liquid or any other foreign matter adheres to the hinge joint.

According to a certain aspect of the present invention, in the above configuration, the lower end of the upper arm piece (10) and/or the upper end of the lower arm piece (11) are provided with a bulging potion (16) protruding inward beyond the hinge joint (12) on a side part of the hinge joint (12).

Since the bulging portion contacts the container and the hinge joint does not contact the container, the hinge joint is protected, and the durability of the arm is improved.

According to a certain aspect of the present invention, in the above configuration, one of the hinge joint (12) and the bulging portion (16) is provided as a pair so as to be separated from each other on either side, and the other of the hinge joint (12) and the bulging portion (16) is positioned between the pair.

Since the area of contact of the bulging portion with the container can be reduced, the container can be smoothly inserted and removed.

According to a certain aspect of the present invention, in any of the above configurations, the upper end of the upper arm piece (10) is supported by a pair of side surfaces (20) defining the arm receiving groove via a pin slot engagement portion (22), and the spring includes a torsion coil spring wound around a first guide pine (21) of the pin slot engagement portion (22) and having a first end engaged by the upper end of the upper arm piece (10) and a second end engaged by the holder main body (2) to provide a rotational biasing force that urges the upper end of the upper arm piece outward and the lower end of the upper arm piece inward.

Thereby, when a container is pulled out of the cup holder, and a force directed obliquely upward and outward is applied to the bulging portion, since the upper arm piece is displaced obliquely upward and outward, the container is not caught by the bulging portion, and can be pulled out in a smooth manner.

According to a certain aspect of the present invention, in the above configuration, the pin slot engagement portion (22) includes a pair of first guide pins (21) projecting coaxially from the respective side surfaces (20) defining the arm receiving groove (9), and a pair of guide slots (19) formed in side parts (18) of the upper arm piece (10), respectively, so as to receive the first guide pins, respectively, and each guide slot (19) includes a first slot portion (19a) extending inward and outward, and a second slot portion (19b) extending from an intermediate part of the first slot portion to an upper edge of the upper arm piece (10).

Since the first guide pin can be inserted into the first slot portion via the second slot portion, the arm can be easily assembled to the holder main body.

According to a certain aspect of the present invention, in the fourth or fifth configuration, the lower end of the lower arm piece (11) is provided with a pair of second guide pins (27) protruding laterally in either direction, and the side surfaces (20) defining the arm receiving groove (9) are formed with guide grooves (28) to receive the second guide pins (27) in a rotatable and vertically movable manner, respectively.

Since the lower end of the lower arm piece is received by the guide groove and does not protrude outside the holder main body, the installation space for the cup holder can be reduced. Further, since the second guide pins are received by the guide grooves in a rotatable and vertically movable manner, even if a force directed obliquely upward and outward is applied to the bulging portion to pull the container out of the cup holder, the lower arm piece can rotate around the guide pins so that the container does not get caught by the bulging portion and the container can be pulled out smoothly.

According to a certain aspect of the present invention, in the above configuration, the side surfaces (20) defining the arm receiving groove (9) are formed as tapered surfaces such that a distance between the side surfaces (20) progressively decreases toward lower parts thereof, and an upper end of the arm receiving groove (9) is positioned at or above a position where the distance between the side surfaces (20) is equal to a distance between free ends of the second guide pins (27).

Since the arm receiving groove includes a part having a width greater than the distance between the tips or free ends of the second guide pins, the arm can be easily assembled to the holder main body by inserting the second guide pin from that part.

According to a certain aspect of the present invention, in any of the above configurations, the upper arm piece (10) includes a main wall (14) facing inward and a pair of side walls (15) extending outward from side edges of the main wall (14), respectively.

The side walls minimize the deformation of the upper arm piece so that the arm can operate in a stable and reliable manner.

According to a certain aspect of the present invention, in the above configuration, the side wall (15) of the upper arm piece (10) is provided with a stopper (23) that engages the lower arm piece (11) to define the initial position.

Thus, excessive deformation of the hinge joint is prevented by the stopper.

According to a certain aspect of the present invention, in any of the above configurations, the arm is made of an integrally molded product made of a resin material.

Thereby, the number of component parts can be reduced, and the manufacturing cost can be reduced.

Effect of the Invention

The present invention thus provides a cup holder that can prevent malfunction and generation of abnormal noise due to adhesion of liquid or other foreign matter.

BRIEF DESCRIPTION OF THE DRAWINGS

FIG. 7 is an explanatory view showing a container being inserted in the cup holder of the present embodiment;

FIG. 8 is an explanatory view showing a container being retained in the cup holder of the present embodiment; and FIG. 9 is an explanatory view showing a container being removed from the cup holder of the present embodiment.

DETAILED DESCRIPTION OF THE PREFERRED EMBODIMENT(S)

Figure 1:
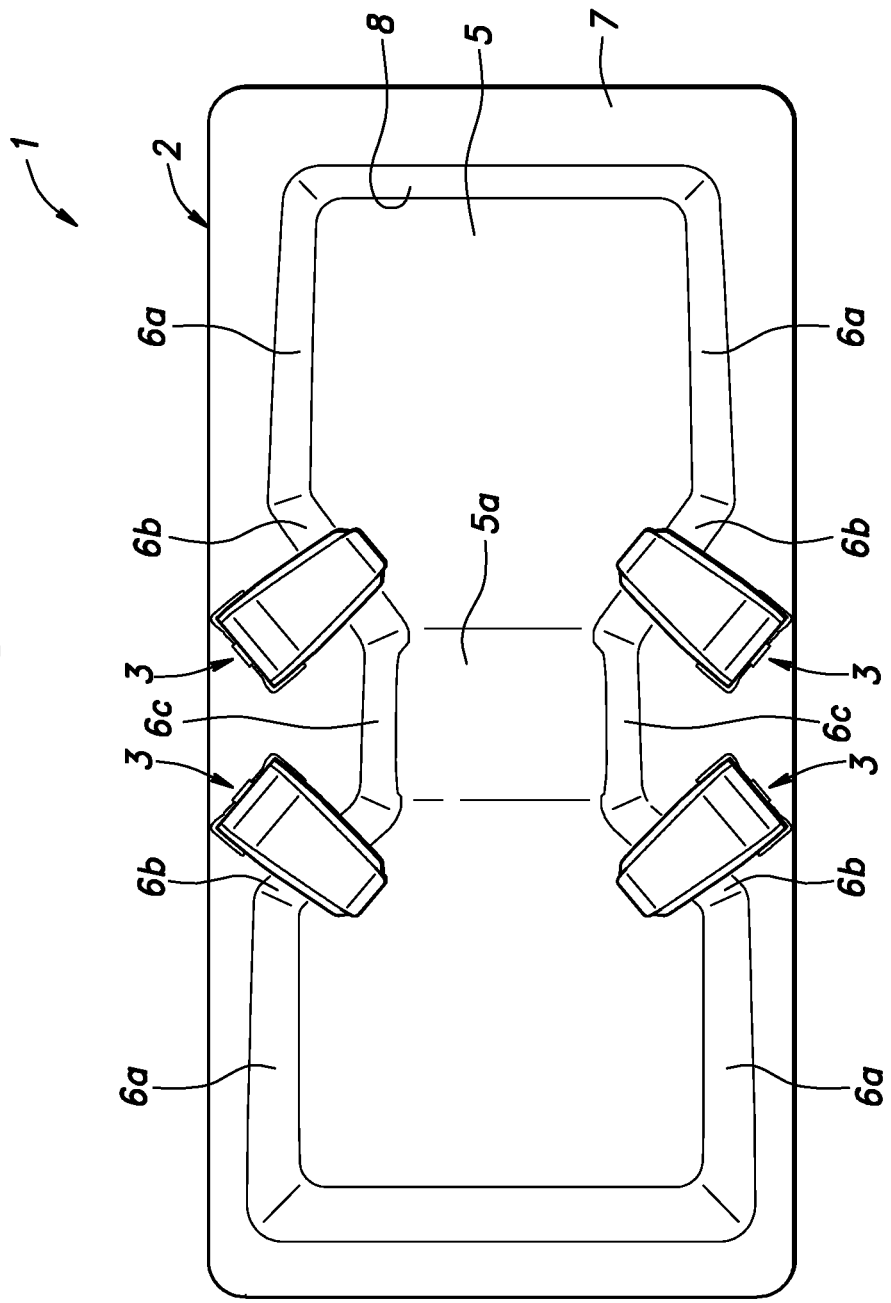
FIG. 1 is a plan view of a cup holder according to an embodiment of the present invention.
Figure 2:
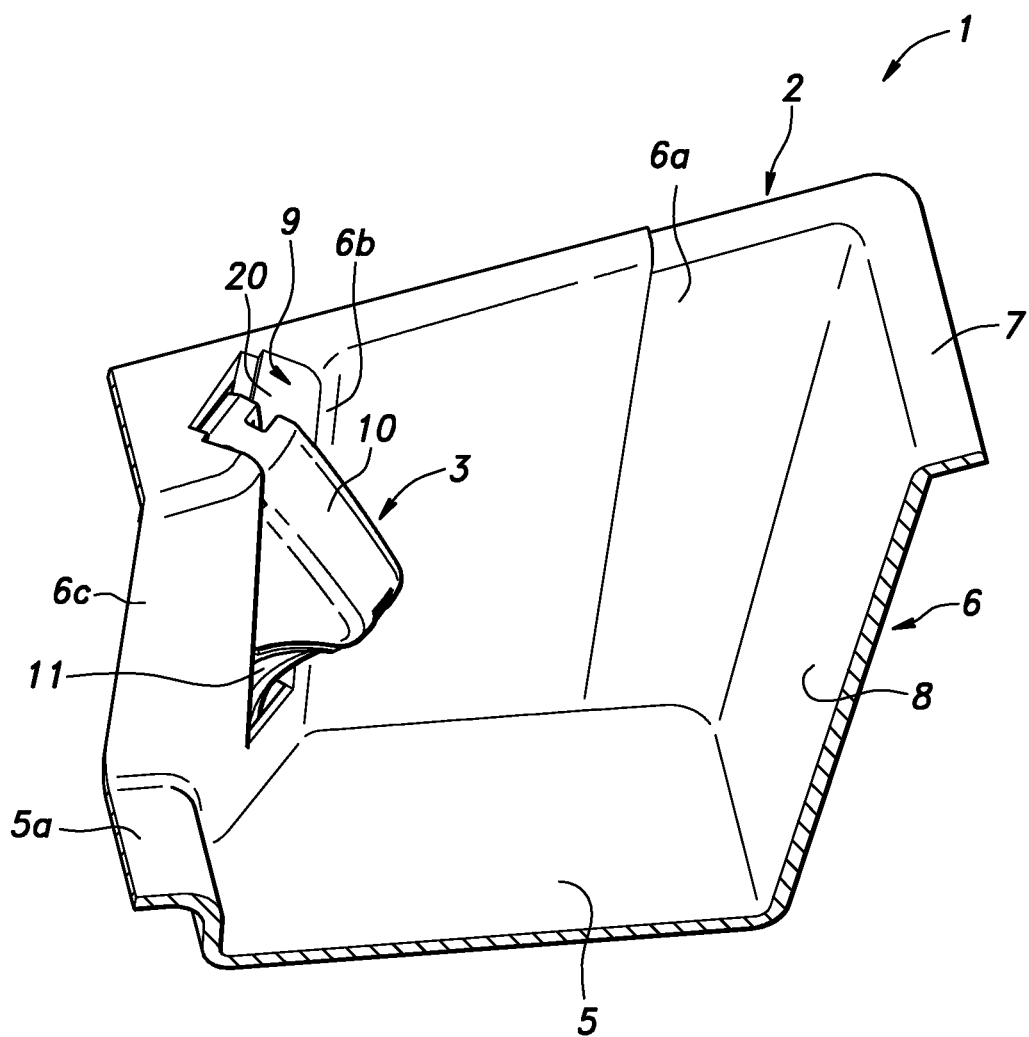
FIG. 2 is a fragmentary perspective view of the cup holder of the present embodiment.
Figure 3:
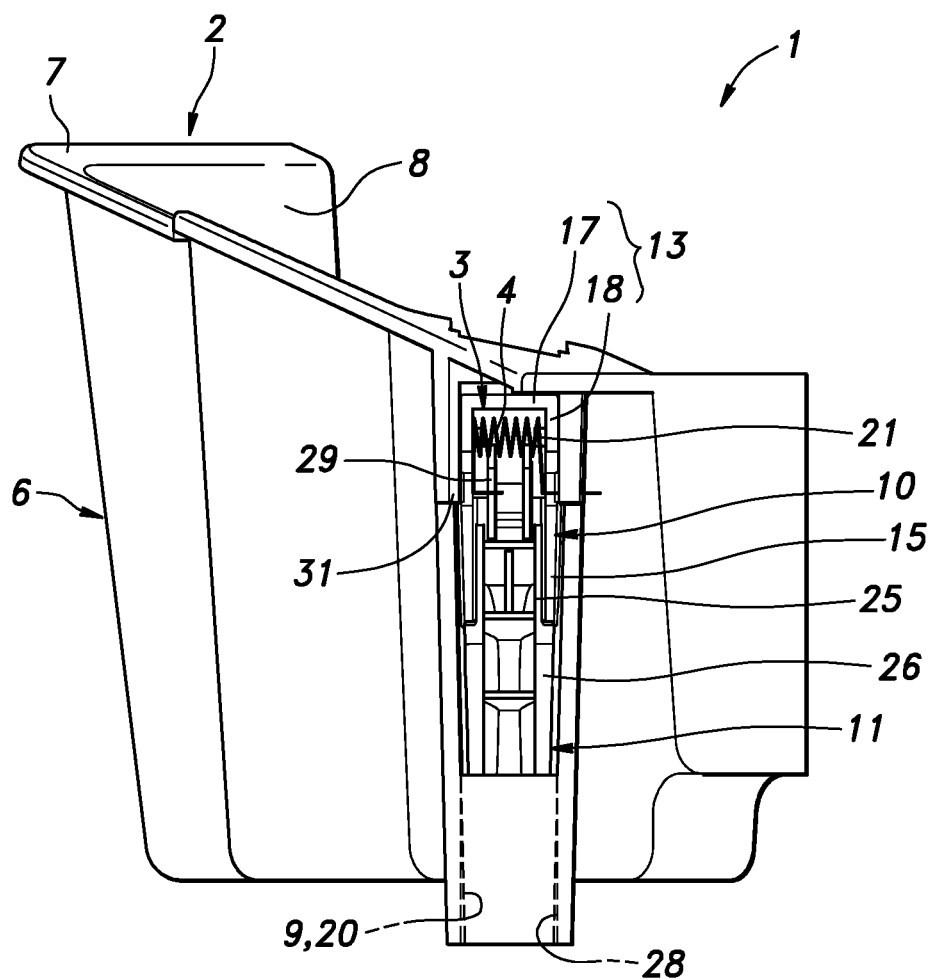
FIG. 3 is a fragmentary external view of the cup holder of the present embodiment.

An embodiment of the present invention will be described in the following with reference to the appended drawings. FIG. 1 is a plan view of the cup holder 1 according to the embodiment, FIG. 2 is a perspective view showing a part of the interior of the cup holder 1, and FIG. 3 is a view of an exterior part of the cup holder 1 as seen from an oblique horizontal direction (the external view of an arm 3 which will be described later).

The cup holder 1 is configured to hold a container such as a beverage container, and includes a holder main body 2, four arms 3 fitted to the holder main body 2, and springs 4 for urging the respective arms 3. The cup holder 1 is fixed to a center console in the interior of the passenger compartment of a vehicle.

The holder main body 2 includes a bottom wall 5 that supports the container from below, a side wall 6 that extends upright from the peripheral edge of the bottom wall 5 and surrounds at least a lower part of the side surface of the container, and a flange 7 that extends outward from the upper end of the side wall 6 so that the bottom wall 5 and the side wall 6 define a recess 8 having an open upper end. The holder main body 2 is, for example, a molded product made of resin material.

The side wall 6 includes parts that extend in the fore and aft direction and parts that extend in the lateral direction. The fore and aft direction and the lateral direction of the holder main body 2 correspond to the lengthwise direction and the widthwise direction in plan view, respectively. The side wall 6 includes main parts 6a that extend in the fore and aft direction in a front and a rear part thereof, oblique parts 6b that is angled inward toward the central part thereof with respect to the fore and aft direction, and a pair of central parts 6c that extend over a certain section in the fore and aft direction mutually opposing each other at a smaller distance than the main parts 6a. The bottom wall 5 includes a central part 5a that bulges upward at a position corresponding to the central parts 6c of the side wall 6 along the fore and aft direction. The recess 8 is thus divided into two parts, one in front and the other in the back, by the central part 5a of the bottom wall 5 and the central parts 6c of the side wall 6, and the container can be accommodated in each of the two divided parts of the recess 8. The cup holder 1 may be a mirror symmetrical with respect to a plane that passes the center thereof with respect to the fore and aft direction and orthogonal to the fore and aft direction and/or a plane that passes the center thereof with respect to the lateral direction and orthogonal to the lateral direction Each oblique part 6b of the side wall 6 is provided with an arm receiving groove 9 that partly receives the corresponding arm 3. A part of the arm 3 projects into the recess 8 toward the container that is inserted in the recess 8 in order to hold the container. The direction of movement of the arm 3 into the recess 8 is substantially orthogonal to the inner surface of the oblique part 6b of the side wall 6 in plan view. The inward and outward directions of the arm 3 are defined so as to correspond to the movement thereof toward and away from the container received in the recess 8, respectively, and the left-right direction (lateral direction) of the arm corresponds to the widthwise direction (lateral direction) of the arm 3 (or a horizontal direction along the inner surface of the oblique part 6b). An ornamental plate (not shown in the drawings) having a contour that matches the flange 7 in plan view may be attached to the upper surface of the flange 7 so as to conceal the arm receiving grooves 9.

Figure 4:
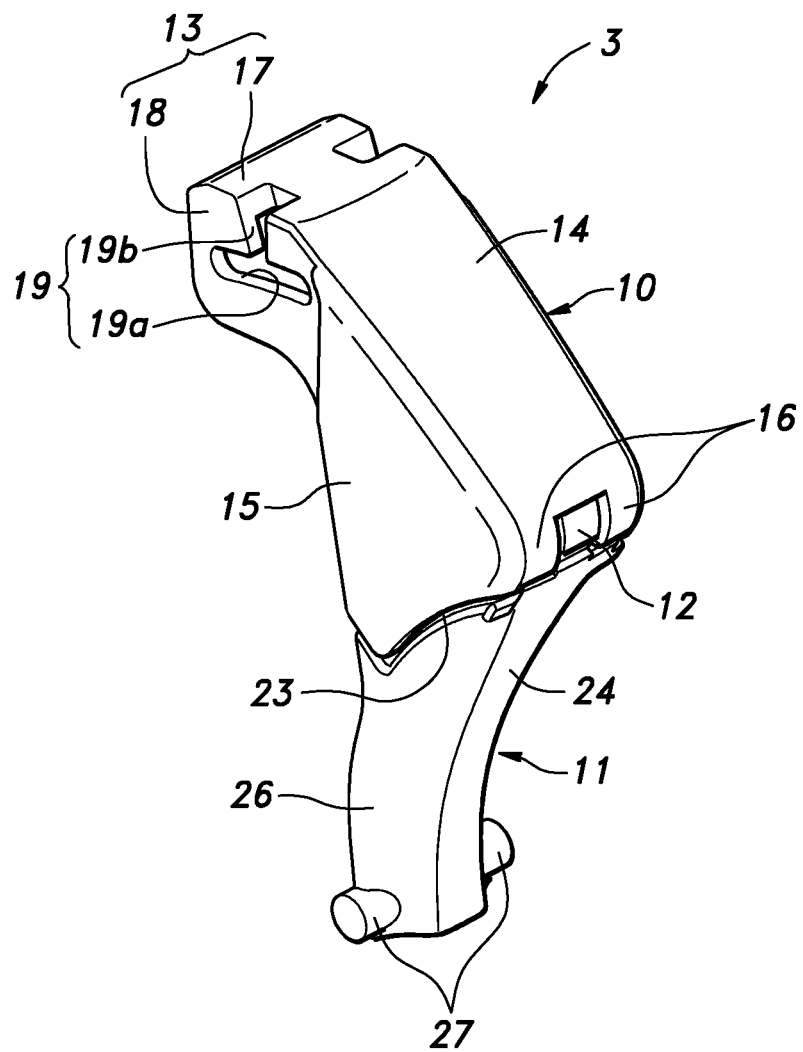
FIG. 4 is a perspective view of an arm of the cup holder of the present embodiment.
Figure 5:
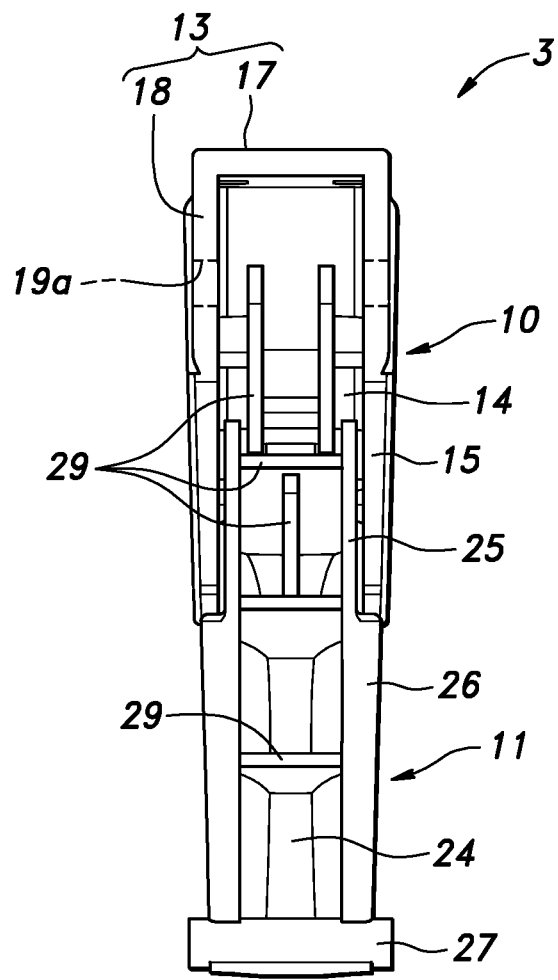
FIG. 5 is an external view of the arm of the cup holder of the present embodiment.

FIG. 4 is a perspective view of the arm 3, and FIG. 5 is an external view of the arm 3. As shown in FIGS. 1 to 5, the arm 3 includes an upper arm piece 10 which is supported by the oblique part 6b of the side wall 6 at the upper end thereof so as to be rotatable and movable in inward and outward directions, a lower arm piece 11 which is supported by the oblique part 6b of the side wall 6 at the lower end thereof so as to be vertically movable and rotatable, and a hinge joint 12 that hinges the lower end of the upper arm piece 10 to the upper end of the lower arm piece 11. The arm 3 is an integrally molded product made of resin material, and the hinge joint 12 consists of a thin-walled hinge formed by a thin-walled portion that can be flexed around a lateral axis. The arm 3 can be displaced between an initial position in which the hinge joint 12 is bent so that the lower end of the lower arm piece 11 comes closer to the upper end of the upper arm piece 10 and the hinge joint 12 projects into the recess 8, and a most extended position in which the hinge joint 12 is unbent so that the lower end of the lower arm piece 11 moves away from the upper end of the upper arm piece 10 and the hinge joint 12 is displaced outward as compared to the initial position causing the distance to the opposing part of the side wall 6 to be maximized.

The upper arm piece 10 includes a support portion 13 which is supported by the side wall 6 of the holder main body 2 so as to be rotatable and movable inward and outward directions, a main wall 14 extending obliquely downward and inward from the support portion 13 and having a main surface facing obliquely in an upward and inward direction, a pair of side walls 15 extending outward from either side edge of the main wall 14, and a bulging portion 16 bulging from the lower end of the main wall 14 more inward than the hinge joint 12.

The support portion 13 includes an upper wall 17 extending outward from the upper end of the main wall 14 and a pair of upper side walls 18 extending downward from the respective side edges of the upper wall 17 and connected to the respective side walls 15. A guide slot 19 is provided in each upper side wall 18, and a pair of first guide pins 21 project from side surfaces 20 of the side wall 6 of the holder main body 2 defining the arm receiving groove 9 from either side in a coaxial relationship. By passing the first guide pins 21 into the corresponding guide slots 19, a pin slot engagement portion 22 (see FIG. 6) is formed whereby the upper arm piece 10 is supported by the holder main body 2 so as to be rotatable and movable in inward and outward directions.

Each guide slot 19 includes a first slot portion 19a extending in the inward and outward directions, and a second slot portion 19b extending from an intermediate part of the first slot portion 19a to the upper surface of the upper wall 17. The first slot portion 19a is passed through the upper side wall 18, and the first guide pin 21 is passed through the first slot portion 19a. The part of the upper wall 17 corresponding to the second slot portion 19b provides a bottom of the second slot portion 19b which is deep enough to allow the first guide pin 21 to be introduced into the second slot portion 19b from above. The second slot portion 19b is otherwise passed through the upper side wall 18.

The main surface of the main wall 14 is a smooth surface, preferably a flat surface, so that the edge of the bottom of the container can easily slide over the main wall 14. The main surface of the main wall 14 is smoothly continuous with the inward surface of the bulging portion 16. The lower edge of the side wall 15 servers as a first stopper 23 that abuts against the lower arm piece 11 at the initial position to define the initial position. In this case, the bulging portion 16 consists of two parts positioned on either side of the hinge joint 12.

The lower arm piece 11 includes a main wall 24 having a main surface facing obliquely downward and inward, a pair of first side walls 25 extending outward from either side edge of an upper part of the main wall 24 and positioned between the side walls 15 of the upper arm piece 10 and adjacent thereto in the initial position, a pair of second side walls 26 extending outward from either side edge of a lower part of the main wall 24, and a pair of second guide pins 27 projecting laterally outward in a coaxal relationship from lower end parts of the second side walls 26, respectively.

The main surface of the main wall 24 is preferably a smooth surface because the container which may have a recessed side surface slides over the main surface of the main wall 24 when the container is being pulled out from the cup holder 1. The upper edge of the second side wall 26 is engaged by the first stopper 23 provided on the side wall 15 of the upper arm piece 10 at the initial position.

The second guide pins 27 are received by the guide grooves 28 extending vertically in the side surfaces 20 defining the arm receiving groove 9 so as to be vertically movable and rotatable. The side surfaces 20 are formed as tapered surfaces so that the distance between the side surfaces 20 defining the arm receiving groove 9 gets narrower toward the lower end thereof. The upper end of the arm receiving groove 9 is positioned where the distance between the side surfaces 20 is equal to or greater than the distance between the free ends of the second guide pins 27. The guide groove 28 may be either bottomed grooves or slots passed through the side wall 6. In the lower part of the arm receiving groove 9, since the lower part of the lower arm piece 11 moves inside the arm receiving groove 9 and does not project into the recess 8, the lower part of the arm receiving groove 9 may not be open on the inward side thereof, and may even be formed as a tubular part having an open upper end.

The hinge joint 12 formed as a thin-walled portion is connected to the lower end of the main wall 14 of the upper arm piece 10 at the upper end thereof, and to the upper end of the main wall 24 of the lower arm piece 11 at the lower end thereof. The hinge joint 12 is provided so that the hinge joint 12 extends along the inward side of the lower end of the upper arm piece 10 and the upper end of the lower arm piece 11, or so that the rotational hinge axis is positioned inward of the hinge joint 12, and defines a smooth profile in side view. The surface of the bulging portion 16 is located inward of the contour of the hinge joint 12 in side view.

The outer surfaces of the main wall 14 of the upper arm piece 10 and the main wall 24 of the lower arm piece 11 are provided with a plurality of ribs 29 for reinforcement.

The spring 4 consists of a torsion coil spring wound around the first guide pins 21 and is engaged by a part of the upper arm piece 10 located below the first guide pins 21 at one end thereof, and by the side wall 6 of the holder main body 2 at the other end thereof. The spring 4 rotationally urges the upper arm piece 10 such that the upper end of the upper arm piece 10 is urged inward, and the lower end of the upper arm piece 10 is urged inward. For example, it may be arranged such that one end of the spring 4 is engaged by a rib 29 of the upper arm piece 10 from the outside, and the other end of the spring 4 is received by an engagement groove 30 (see FIG. 6) formed in a wall part defining the side surface 20 of the arm receiving groove 9.

Figure 6:
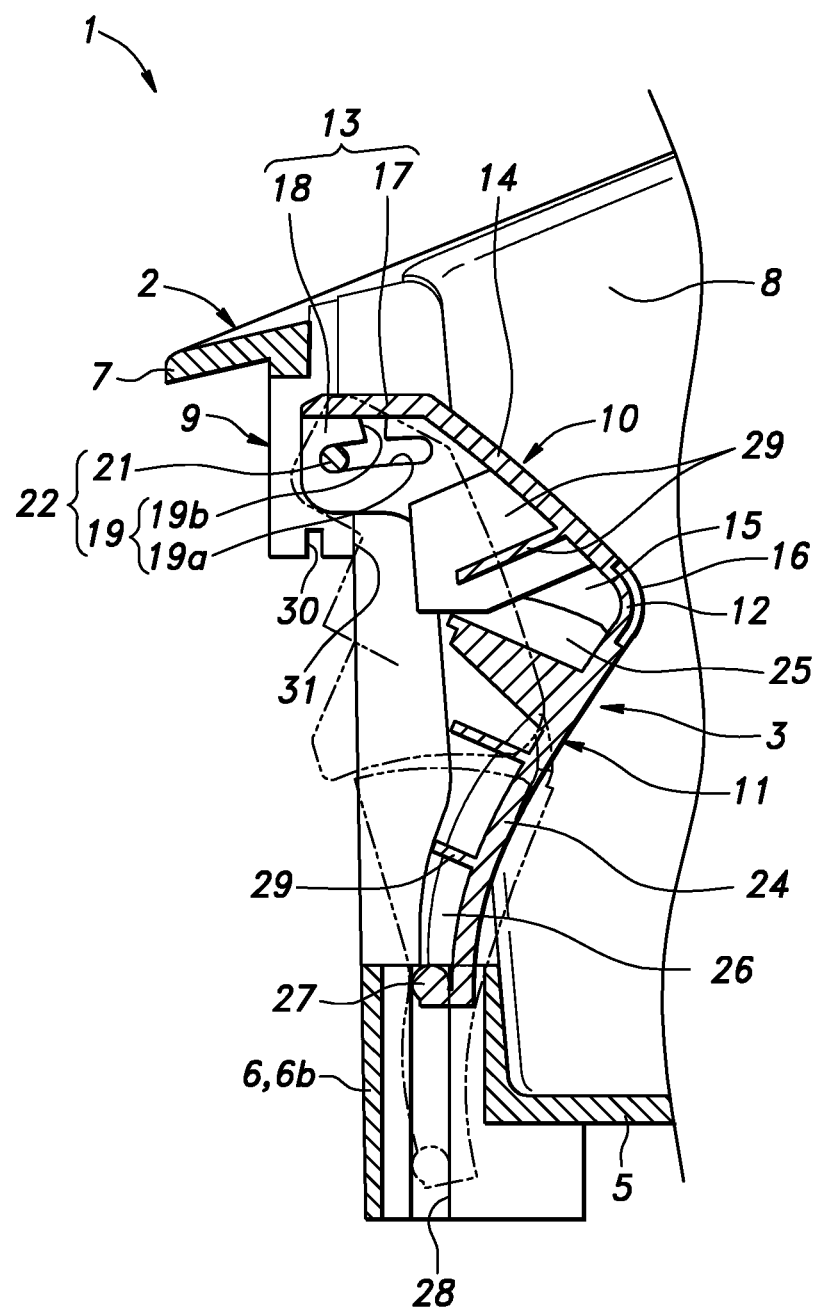
FIG. 6 is a sectional view showing a mode of mounting the arm to the cup holder of the present embodiment.

FIG. 6 is a sectional view of the arm 3 taken along a plane orthogonal to the lateral direction and passing through the laterally central part of the arm 3. The solid lines indicate the initial position of the arm 3 where the hinge joint 12 is bent to such an extent that the lower arm piece 11 is engaged by the first stopper 23 under the biasing force of the spring 4. The initial position is the position of the arm 3 when the container is not inserted in the recess 8. The double-dot chain lines indicate the most extended position of the arm 3 where the edges of the side walls 6 of the upper arm piece 10 are engaged by the second stopper 31 provided on the side surfaces 20 defining the arm receiving groove 9. The second stopper 31 is formed by causing the outer parts of the side surfaces 20 to be located laterally closer to each other than the inner parts of the side surfaces. A retaining position is defined between the initial position and the most extended position as a position where the container is retained by the cooperation between the arms 3 and the side wall 6 of the holder main body 2.

The process of assembling the arm 3 and the spring 4 to the holder main body 2 will be described in the following. The second guide pins 27 of the lower arm piece 11 are inserted into the guide grooves 28 from above, and the first guide pins 21 of the holder main body 2 are inserted into the first slot portions 19a via the second slot portions 19b. Then, the spring 4 is wound around the first guide pins 21, and the two ends of the spring 4 are engaged by the upper arm piece 10 and the holder main body 2, respectively. The side surfaces 20 defining the arm receiving groove 9 are tapered surfaces, and the distance between the side surfaces 20 in the upper part of the arm receiving groove 9 is greater than the distance between the tips of the second guide pins 27. Therefore, the second guide pins 27 can be easily inserted into the guide grooves 28.

FIGS. 7 to 9 are views for explaining the movement of the arm 3. FIG. 7 shows a container being inserted, FIG. 8 shows a container being held, and FIG. 9 shows a container being removed. In FIGS. 7-9, letter "B" denotes a container. The lower part of the container is smaller in diameter than the bottom end thereof, and is thus provided with a waist (recessed part). The movement of the arm 3 when the container is inserted and pulled out will be described in the following with reference to FIGS. 6 to 9.

As shown in FIG. 7, when inserting the container, first, the edge of the bottom end of the container slides on the main surface of the main wall 14 of the upper arm piece 10. At this time, the outer end of the first slot portion 19a is pressed against the first guide pin 21 under the biasing force of the spring 4 directed inward, and the upper arm piece 10 rotates around a first rotational axis 32, which is the center line of the pin 21, against the biasing force of the spring 4 so that the lower end part thereof moves downward. As a result of this movement, the thin-walled portion forming the hinge joint 12 is unbent so that the second guide pins 27 of the lower arm piece 11 slide downward along the guide grooves 28. Thereafter, the side surface of the container slides over the bulging portion 16 (see FIG. 4) until the bottom end of the container comes to be supported by the bottom wall 5. During this process, the upper arm piece 10 rotates around the first rotational axis 32 with the outer end of the first slot portion 19a abutting against the first guide pin 21, the hinge joint 12 is deformed, and the second guide pins 27 travel vertically, all according to the shape of the side surface of the container.

As shown in FIG. 8, when the container is retained by the cup holder 1, the bottom wall 5 supports the bottom end of the container from below, and the arms 3 and the side wall 6 jointly support the side surface of the container (the side wall 6 is contact with the container at positions not shown in FIG. 8).

As shown in FIG. 9, when the container is being pulled out from the cup holder 1, particularly when the part of the container immediately below the waist slides over the bulging portion 16, the diameter of the side surface of the container which is in contact with the bulging portion 16 progressively increases so that the bulging portion 16 receives a force directed obliquely upward and outward from the container. As a result, the lower arm piece 11 is rotated around a second rotation axis 33, which is the center of the second guide pins 27, so that the upper end thereof moves outward while the support portion 13 of the upper arm piece 10 moves outward with the edge surface of the first slot portion 19a sliding over the first guide pins 21. When the container is completely pulled out, the arm 3 returns to its initial position under the biasing force of the spring 4.

The mode of operation and effect of the cup holder 1 according to the present embodiment will be described in the following.

Since the hinge joint 12 is formed as a thin-walled hinge having no shaft body or bearing, malfunction or abnormal noise does not occur even if liquid or other foreign matter adheres to the hinge joint 12. Further, since the arm 3 is a single-piece integrally molded product, the number of parts is reduced and the manufacturing cost can be reduced. Since the upper arm piece 10 includes the side walls 15 and the lower arm piece 11 includes the first side walls 25 and the second side walls 26, deformation of the upper arm piece 10 and the lower arm piece 11 is minimized so that the arm 3 can operate in a stable and reliable manner. Further, in the initial position, since the first side walls 25 of the lower arm piece 11 are positioned so as to laterally overlap with the side walls 15 of the upper arm piece 10, even if a twisting force acts on the arm 3, owing to the mutual locking between the side walls 15 and the first side walls 25, deformation of the arm 3 is minimized, and the arm 3 can operate in a stable and reliable manner.

Since the bulging portion 16 comes into contact with the container whereas the hinge joint 12 does not come into contact with the container, the load on the hinge joint 12 formed by the thin-walled portion is slight so that the durability thereof is improved. Further, since the bulging portion 16 is provided by a pair positioned on either side of the hinge joint 12, instead of extending laterally over the entire width of the arm 3, the contact area with the container is reduced so that the container can be smoothly inserted and pulled out.

Since the support portion 13 of the upper arm piece 10 moves outward and the lower arm piece 11 rotates about the second rotation axis 33 at the time of pulling out the container, even if the container has a recessed part on the side surface or has a soft side surface, the container is not caught by the arm 3 which is resiliently urged by the spring 4 so that the container can be smoothly pulled out from the cup holder 1.

Since the spring 4 consists of a torsion coil spring, a single spring 4 can urge the arm 3 both rotationally and inward.

Since the side surfaces 20 defining the arm receiving groove 9 are tapered, and the distance between the side surfaces at the upper part is greater than the distance between the tips of the second guide pins 27, the assembling of the arm 3 to the holder main body 2 is facilitated.

Since the second guide pins 27 provided in the lower end part of the lower arm piece 11 are configured to move vertically in the guide groove 28, the lower end of the lower arm piece 11 does not project outward so that the cup holder 1 can be installed in a limited space.

Since the first stopper 23 and the second stopper 31 prevent excessive deformation of the hinge joint 12, the load on the hinge joint 12 is prevented from becoming excessive.

The present invention has been described in terms of a specific embodiment, but is not limited to such an embodiment, and can be modified in various ways without departing from the scope of the present invention. The cup holder may be fixed to a part other than the center console such as an instrument panel, or may be fixed to the interior of a vehicle other than a road vehicle. The hinge joint may also be provided as a pair positioned laterally on either side of a single bulging portion. Alternatively or additionally, a bulging portion may be provided on the lower arm piece. The spring is not limited to a torsion coil spring, and may consist of two individual springs that rotationally and outwardly urge the arm, respectively. The entire contents of the basic application for priority claim under the Paris Convention for the present application and the entire contents of the prior art mentioned in this application are incorporated herein by reference.

LIST OF REFERENCE NUMERALS

| | |
|---|---|
| 1: cup holder | 2: holder main body |
| 3: arm | 4: spring |
| 6: side wall | 8: recess |
| 9: arm receiving groove | 10: upper arm piece |
| 11: lower arm piece | 12: hinge joint |
| 14: upper arm piece main wall | 15: upper arm piece side wall |
| 16: bulging portion | 18: upper side wall (side part) |
| 19: guide slot | 19a: first slot |
| 19b: second slot | 20: side surface |
| 21: first guide pin | 22: pin slot engaging part |
| 23: first stopper (stopper) | 27: second guide pin (lower arm piece) |
| 28: guide groove | |

The invention claimed is:

1. A cup holder for holding a container, comprising:
a holder main body defining a recess for accommodating the container therein and an arm receiving groove extending vertically and communicating with the recess;
at least one arm including an upper arm piece partly received in the arm receiving groove and supported by the holder main body at an upper end thereof, a lower arm piece partly received in the arm receiving groove and supported at a lower end thereof by the holder main body in a vertically movable manner, and a thin-walled portion that forms a hinge joint between a lower end of the upper arm piece and an upper end of the lower arm piece, in such a manner that the hinge joint allows the arm to be moveable between an initial position projecting into the recess and a most extended position located outward of the initial position; and
a spring that urges the arm towards the initial position,
wherein the arm receiving groove is defined by a pair of side surfaces,
wherein the lower end of the lower arm piece is provided with a pair of second guide pins protruding laterally in either direction, and the side surfaces defining the arm receiving groove are formed with guide grooves to receive the second guide pins in a rotatable and vertically movable manner, respectively.

2. The cup holder according to claim 1, wherein the lower end of the upper arm piece and/or the upper end of the lower arm piece are provided with a bulging potion protruding inward beyond the hinge joint on a side part of the hinge joint.

3. The cup holder according to claim 2, wherein one of the hinge joint and the bulging portion is provided as a pair so as to be separated from each other on either side, and the other of the hinge joint and the bulging portion is positioned between the pair.

4. The cup holder according to claim 1, wherein the upper end of the upper arm piece is supported by the pair of side surfaces defining the arm receiving groove via a pin slot engagement portion, and the spring includes a torsion coil spring wound around a first guide pin of the pin slot engagement portion and having a first end engaged by the upper end of the upper arm piece and a second end engaged by the holder main body to provide a rotational biasing force that urges the upper end of the upper arm piece outward and the lower end of the upper arm piece inward.

5. The cup holder according to claim 4, wherein the pin slot engagement portion includes a pair of first guide pins projecting coaxially from the respective side surfaces defining the arm receiving groove, and a pair of guide slots formed in side parts of the upper arm piece, respectively, so as to receive the first guide pins, respectively, and each guide slot includes a first slot portion extending inward and outward, and a second slot portion extending from an intermediate part of the first slot portion to an upper edge of the upper arm piece.

6. The cup holder according to claim 1, wherein the side surfaces defining the arm receiving groove are formed as tapered surfaces such that a distance between the side surfaces progressively decreases toward lower parts thereof, and an upper end of the arm receiving groove is positioned at or above a position where the distance between the side surfaces is equal to a distance between free ends of the second guide pins.

7. The cup holder according to claim 1, wherein the upper arm piece includes a main wall facing inward and a pair of side walls extending outward from side edges of the main wall, respectively.

8. The cup holder according to claim 7, wherein at least one side wall of the pair of side walls of the upper arm piece is provided with a stopper that engages the lower arm piece to define the initial position.

9. The cup holder according to claim 1, wherein the arm is made of an integrally molded product made of a resin material.

* * * * *